United States Patent [19]

Gonzales

[11] Patent Number: 4,964,657
[45] Date of Patent: Oct. 23, 1990

[54] WATER FACET INLET LINE CONNECTOR

[75] Inventor: Teodoro J. Gonzales, Canyon Country, Calif.

[73] Assignee: Price Pfister, Inc., Pacoima, Calif.

[21] Appl. No.: 347,106

[22] Filed: May 3, 1989

[51] Int. Cl.$^5$ ............................................. F16L 21/02
[52] U.S. Cl. ........................................ 285/8; 285/38; 285/340; 285/348; 285/332; 285/921
[58] Field of Search ...................... 285/340, 8, 38, 348, 285/332, 921

[56] References Cited

U.S. PATENT DOCUMENTS

| | | | |
|---|---|---|---|
| 2,434,846 | 1/1948 | Hagan | 285/8 |
| 3,429,596 | 2/1969 | Marshall | 285/340 |
| 3,679,241 | 7/1972 | Hoffmann | 285/340 |
| 4,258,943 | 3/1981 | Vogt et al. | 285/340 |

*Primary Examiner*—Dave W. Arola
*Attorney, Agent, or Firm*—Barry E. Deutsch; J. Bruce Hoofnagle

[57] ABSTRACT

An inlet water line connector for connecting an inlet water line to the end of a water faucet shank having external threads on the outer cylindrical surface thereof. The body has an opening therethrough into which first end and inlet water tube of a predetermined outer diameter may be inserted. The body has an outer tapered surface for fitting within and engaging a tapered internal inlet region of the faucet shank. The outer tapered surface of the body has a forced fit with the tapered internal inlet region of the faucet shank. A retention member is disposed within the body and has a relaxed state and a holding state. The retention element remains in its relaxed state as the water line is inserted through the body whereby it is in spaced relation to the water line. The retention element is moved into its holding state after the water line has been inserted through the body to place the retention element into intimate contact with the water line.

21 Claims, 5 Drawing Sheets

WATER FACET INLET LINE CONNECTOR

BACKGROUND OF THE INVENTION

This invention relates in general to connectors used to join the shank of a water faucet to a water supply line or tube and in particular to a connector having improved sealing characteristics while concomitantly reducing the force required to insert the water supply tube into the connector.

In U.S. Pat. No. 4,655,486 assigned to the same assignee as the assignee hereof, there is disclosed a connector for joining a shank of a water faucet to a water supply line or tube. The prior connector comprised two body members having a conical or belleville type spring entrapped therebetween. While said prior connector provided a quick and reliable connecting means, it was recognized that said prior connector suffered from certain deficiencies.

For example, the prior connector required a relatively large force to push the tube through the retention device of the connector to overcome the frictional resistance of said retention device.

Further, in the prior art connector design, the grabbing or retention force between the retention element thereof and the tube was determined by the initial diametric interference therebetween. Accordingly, regardless of the tubing material, the retention force exerted by the retention element on the tube was the same. In instances where the tubing material is hard, such as chrome plated tube, the retention force developed by the fixed interference between the tube and the retention element may not be adequate to bite into the hard surface of the tube, resulting in possible slippage and failure of the tube/faucet connection.

A still further disadvantage with the prior art connector related to the use of the formation of a thermoplastic bead on the inside surface of one of the body members to form a seal between the outside surface of the tube and the inside surface of the connector. Due to manufacturing tolerances, the integrally formed thermoplastic bead seal was not always as reliable as might be desired.

As noted previously, the retention force between the connector and tubing was developed by diametric interference between the retention element and tube. As a result of such diametric interference, score marks were produced on the tube surface as the tube was inserted through the retention element In some instances, the score marks functioned as by-pass channels about the seal of the connector which resulted in undesirable leakage.

Finally, in the prior art design, once the tube was inserted into the connector, the tube could not be retracted. Due to the diametric interference between the retention element and the tube, any attempted retraction of the tube would generally result in damage to either the tube or connector.

The disadvantages discussed above are eliminated in the connector of the present design. The present connector no longer relies upon diametric interference between the retention device and tube to develop the retention force. In the present device initial diametric interference between the retention element and tube is eliminated; the retention force is developed after the tube is inserted into the connector. Further, in the connector of the present invention, the magnitude of the grabbing or retention force can be varied so that the force is adequate to prevent relative movement of the tube and connector regardless of the tubing material.

Since the force developed by the diametric interference of the tubing and connector has been eliminated in the present connector, and the retention force is developed after the tubing is inserted into the connector, the force may be subsequently eliminated and the tubing readily removed after insertion. Further, since the diametric interference between the tube and connector has been eliminated, scoring of the tube is likewise no longer a problem.

Finally, the present connector utilizes a standard elastomer O-ring to improve sealing reliability. The use of a standard elastomer O-ring avoids the necessity of utilizing an integral thermoplastic bead on the inside surface of one of the body members forming the connector.

Accordingly, an object of this invention is a connector for joining the flange of a water faucet to a water supply line which has improved sealing characteristics and whereby the retention force for maintaining the water supply line within the connector is generated after the supply line is inserted into the connector.

SUMMARY OF THE INVENTION

The forgoing object and other objects of the invention are attained in an inlet water line connector for connecting an inlet water line having a predetermined outer diameter to the end of a water faucet shank having external threads on the outer cylindrical surface and a tapered internal inlet region larger in diameter than said predetermined outer diameter of the inlet water line, comprising a body having first and second ends and an opening therethrough into which first end an inlet water line of predetermined outer diameter may be inserted, said body having an outer tapered surface for fitting within an engaging tapered internal inlet region of the faucet shank, said body also having a shoulder in the form of an outward directed flange formed on said body between said outward tapered surface and said first end thereof against which pressure may applied to force said body into the internal inlet region of the faucet shank with said outer tapered surface thereof having a forced fit to the tapered internal inlet region of the faucet shank; a retention element within said body including holding means having a relaxed state and a holding state, with said holding means remaining in a relaxed state as the water line is inserted through said body with the holding means in its relaxed state being in spaced relationship to said water line; and means for moving the holding means into its holding state after the water line has been inserted through said body to place the holding means into intimate contact with said water line.

DESCRIPTION OF THE PREFERRED EMBODIMENT

Figure 1:
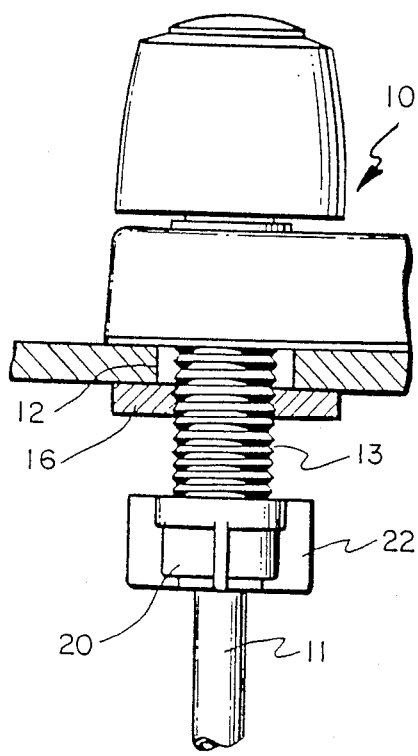
FIG. 1 is a partial cross sectional view of a portion of a typical faucet installation illustrating the present invention connector connecting an inlet water line to a water faucet shank.

Referring now to the drawing, there is disclosed in FIGS. 1 and 3-6 a preferred embodiment of the present invention. FIG. 2 illustrates a prior art faucet connector such as disclosed in U.S. Pat. No. 4,655,486. In referring to the several figures of the drawing like numerals shall refer to like parts.

Figure 2:
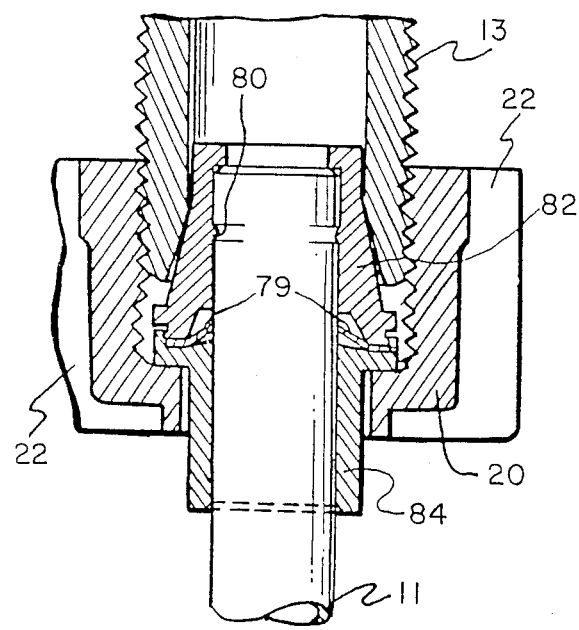
FIG. 2 is a sectional view of a connector in accordance with the prior art.
Figure 3:
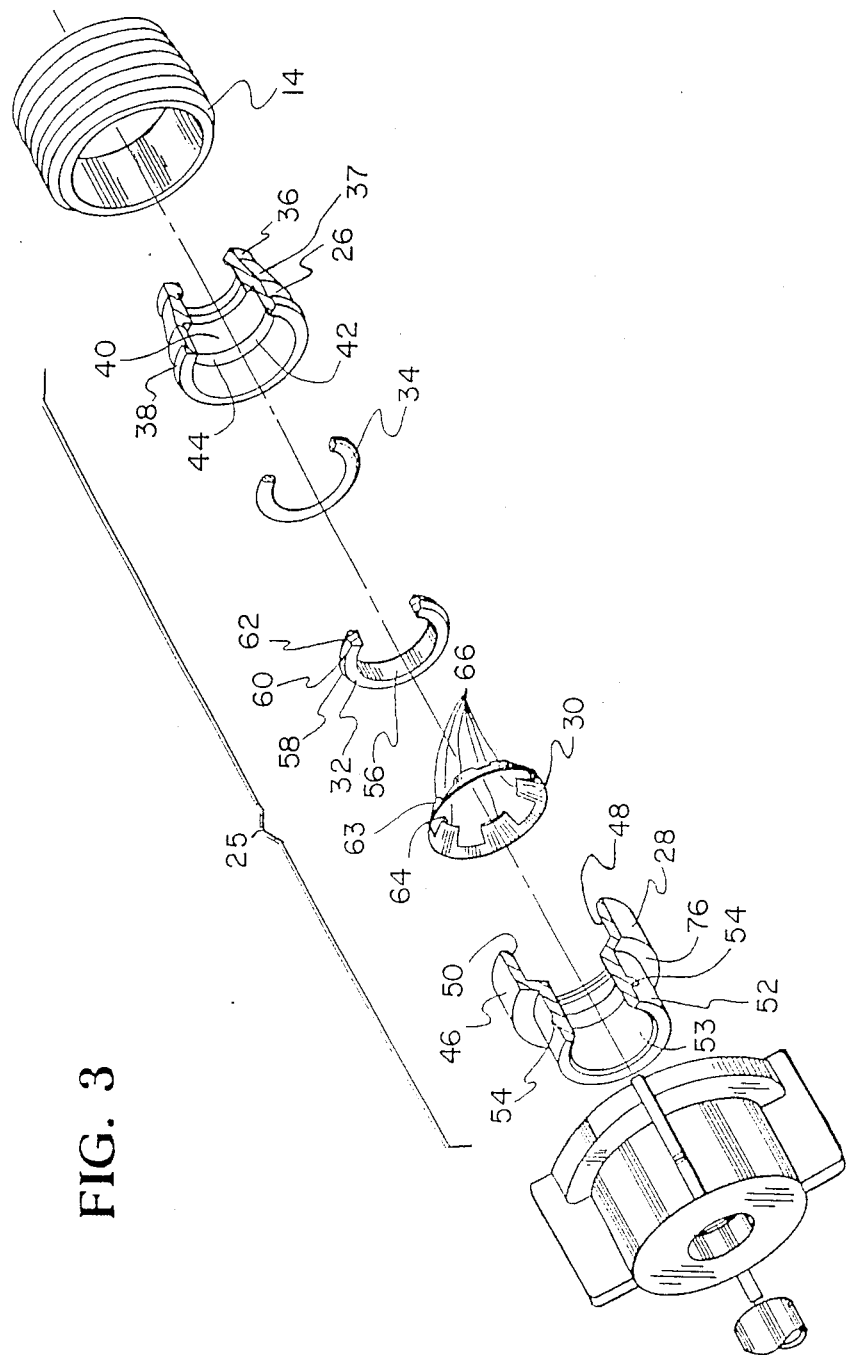
FIG. 3 is an exploded view of the connector of the present invention illustrating details thereof.

FIG. 1 illustrates a partial cross-section of a typical sink faucet installation. Faucet assembly 10, a portion of which is shown, is mounted to a sink through a pair of mounting holes 12 (only one being shown) with the threaded shank 13 of each of the hot and cold water faucet valves passing through a respective hole 12 in the sink and being retained with respect thereto by a locking ring or nut 16.

The present invention relates to a connector which may be utilized for coupling water inlet line or tube 11 to the lower end of threaded shank 13. The present invention connector 25 is ultimately locked in place by a lock nut, such as plastic coupling nut 20 having wings 22 thereon which are used to enable the coupling nut to be manually tightened as required.

The details of connector 25 are particularly illustrated in FIGS. 3-6. Connector 25 comprises an upper body member 26 and lower body member 28 with a retention element shown as a spring member 30, floating retainer ring 32 and O-ring 34 entrapped between the two body members. The spatial relation of upper and lower is relative to the normal installation orientation (as illustrated in FIG. 1).

Figure 4:
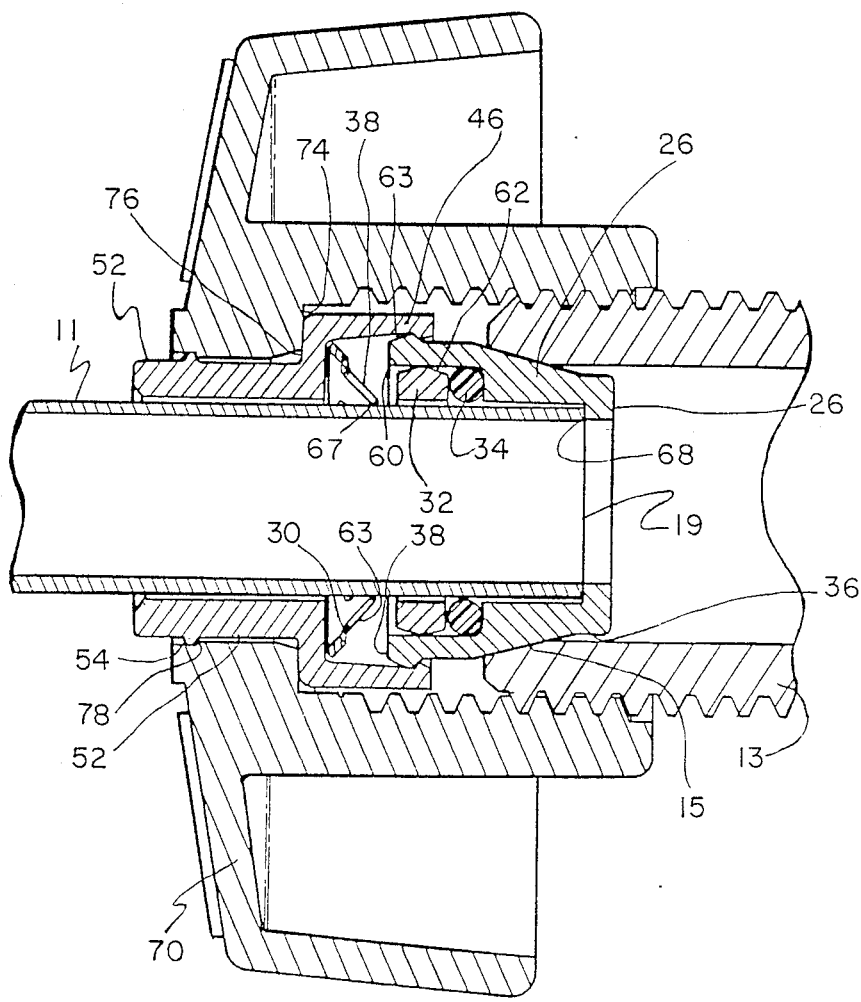
FIG. 4 is a cross sectional view taken along the longitudinal axis of the connector illustrating the retention element thereof in a relaxed state.

Upper body member 26 includes a tapered region 37 terminating at one end in a short cylindrical section 36 and at the other end in a beveled annular flange 38. Upper body member 26 further includes a first generally cylindrical inner surface 40 and a second generally cylindrical surface 44, which latter surface is of a generally greater diameter than the former surface. The junction between inner surfaces 40 and 44 define shoulder 42 therebetween. As illustrated in FIG. 4, the diameter of inner surface 40 is sized so that the upper body member has a loose slip fit over the end of water inlet tube 11 when the tube is inserted into connector 25.

Lower body member 28 comprises a pair of cylindrical sections 46 and 52, with the latter section having a generally smaller diameter than the former section. Inner surface 48 of larger cylindrical section 46 is substantially the same diametrical size as beveled annular flange 38 of upper body member 26. As illustrated particularly in FIGS. 4 and 5, the upper end of cylindrical section 46 includes a beveled annular flange 50 which, when connector 25 is assembled, mates with beveled annular flange 38 of upper body member 26. As illustrated in FIG. 4 the relatively small diameter of inner surface 53 of section 52 of lower body member 46 is sized for a loose fit over the outer surface of water inlet line 11.

Four button shaped projections 54 are molded on the outer surface of cylindrical section 52. The button shaped projections are spaced from each other at approximately 90 degree intervals about the circumference of the outer surface of cylindrical section 52.

Floating ring 32 includes an inner wall 56 which as illustrated in FIG. 4 is in normally spaced relation to the outer surface of tube 11. The outer surface of ring 32 is defined by beveled sections 60 and 62.

Spring member 30 is generally conically shaped and preferably is a Belleville spring. The inner diameter of member 30 is defined collectively by the inner ends of the various spring elements 66. As illustrated in FIG. 4, the inner diameter of the spring is sized to provide a slip fit with respect to the outer surface of inlet tube 11.

Body members 26 and 28 may be joined to each other in substantially any manner desired and in fact need not be joined with any special integrity as they are forcibly held together when in use. In the preferred embodiment, upper body member 26 and lower body member 28 are designed to snap together by utilization of beveled flange 38 of body member 26 in cooperation with beveled flange 50 of lower body member 28. The foregoing described snap fit relationship between the upper and lower body members enables the body members to slide axially relative to each other to compress the entrapped spring member 30, floating ring 32, and O-ring 34. Floating retainer ring 32 and shoulder 42 formed on the inside surface of upper body member 26 cooperate to form the gland for O-ring 34.

Figure 5:
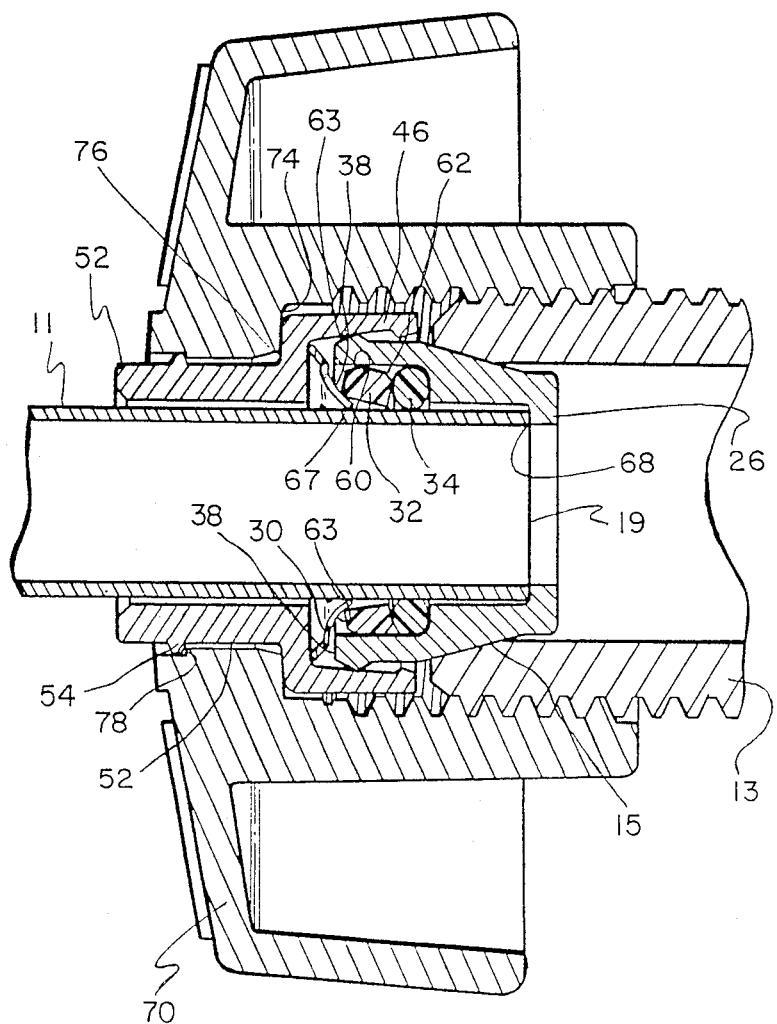
FIG. 5 is a view similar to FIG. 4 illustrating the retention element thereof in a holding state.
Figure 6:
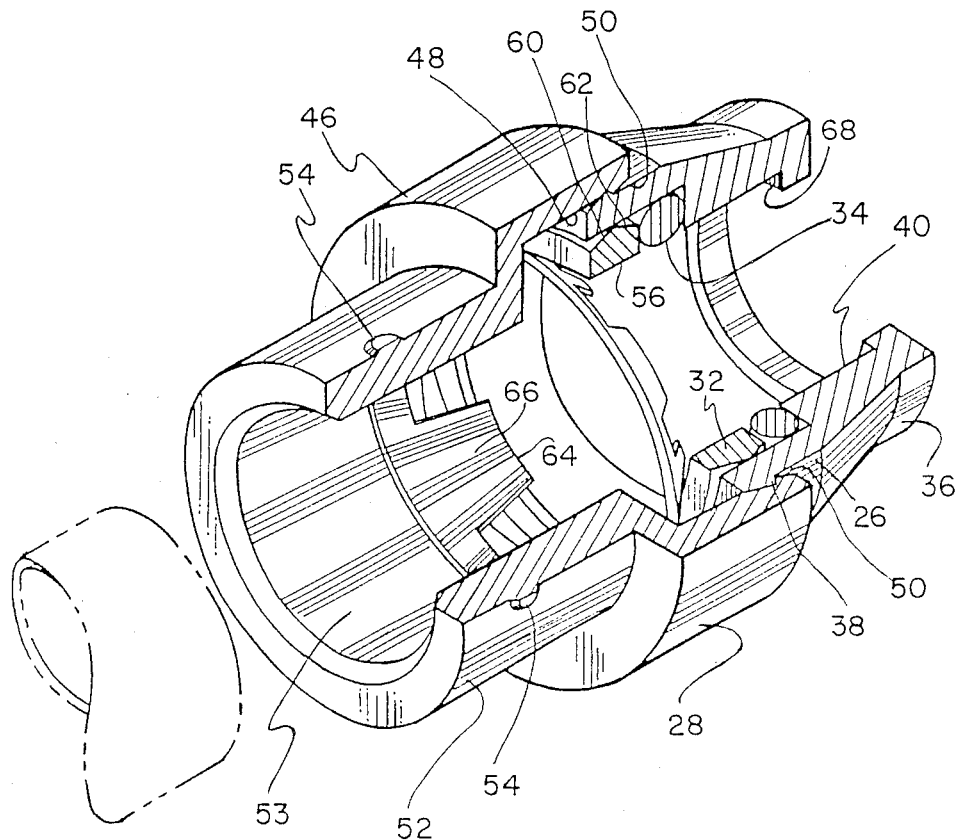
FIG. 6 is a perspective sectional view of the connector of the present invention.

Referring specifically to FIGS. 4 and 5, the use of the connector assembly of the present invention will now be explained with respect to connecting water inlet tube 11 to shank 13 of faucet 10. Initially, connector 25 is first slipped over the end of inlet line 11 until the end 19 of the inlet line abuts stop shoulder 68 formed at the upper end of body member 26. Once the connector is properly positioned on the end of the inlet line, coupling nut 20 is placed therearound whereby shoulder 74 of the coupling nut engages shoulder 76 of body member 28. Likewise, button shaped projections 54 engage a radially inwardly extending shoulder 78 formed on the inner surface of the coupling nut.

The short cylindrical section 36 of upper body member 26 is inserted into the lower tapered end 15 of shank 13. Thereafter, coupling nut 20 is threaded onto the threaded outer surface of shank 13.

To complete the connection of inlet water line 11 to shank 13, coupling nut 20 is tightened. Due to the threaded engagement between the shank and coupling nut, tightening of the nut results in the nut and lower body member being moved axially upward relative to upper body member 26. The foregoing axial movement in turn compresses entrapped spring element 30, floating retainer ring 32 and O-ring 34 against each other. As illustrated in FIG. 5 when sufficient compression force is developed, the inner diameter 56 of retainer ring 32 will contact the inclined surface 63 of each spring element 66 to cause the spring elements to flex inwardly against the outer surface of inlet line 11. Such movement results in the inner edges 67 of each spring element 66 penetrating the outer wall of the inlet line 11 and wedging between the inner diameter surface of retainer ring 32 and the outer wall of the inlet line as clearly illustrated in FIG. 5. This wedging action causes the outward edge of beveled section 62 to be urged into compressing engagement with O-ring 34 again as clearly illustrated in FIG. 5. Similarly, compression of O-ring 34 between retainer ring 32 and shoulder 42 results in the O-ring forming an efficient seal about the outer surface of the inlet line.

The prior art device such as illustrated in FIG. 2, required diametric interference between spring washer 79 and the outer surface of inlet line 11. In the prior art connector, washer 79 was entrapped between upper 82 and lower 84 body members. The retention force developed by such prior art connector was in direct proportion to the diametric interference between the respective parts. In the present invention, the retention force may be varied by axially changing the position of coupling nut 20. Further, the prior art connector inherently had a tendency to score the outer surface of inlet line 11 as the line was inserted and passed across the sharp metal edges of spring washer 79. The score marks formed minute bypass paths about seal 80 of the prior art which effectively reduced the reliability of such seal.

As mentioned previously, in the present invention, the inner surfaces 40, 56, 66, and 53 are normally spaced from the outer surface of water inlet tube 11 to provide a slip fit therebetween. The foregoing results in a significant reduction in the force required to insert the tube within the connector, which not only aids in the installation of the inlet tube by enabling the installer to feel when end 19 of the inlet tube is abutting shoulder 68 of the upper member 26, but in addition enables the installer to fully insert line 11 within the connector and remove the line any number of times prior to tightening coupling nut 20. Further, since spring 30 returns to its relaxed position when the tightening force on coupling nut 20 is eliminated line 11 can be conveniently removed from the connector.

In the prior art connector as is illustrated in FIG. 2, once the inlet tube was inserted within the connector, the tube could not be removed therefrom since the spring washer of the prior art design essentially only permitted one way movement of the tube relative thereto.

As has been previously discussed, the retention force developed by the connector on inlet line 11 is directly related to the torsional force developed through tightening nut 20. If the material forming inlet line 11 is relatively hard, then nut 20 may be tightened a greater amount than if the material forming the inlet line were relatively soft, as for example a plastic material. In effect, the coupling nut can be tightened until the ends of spring elements 66 penetrate the surface of the inlet tube.

While a preferred embodiment of the present invention has been described and illustrated, the invention should not be limited thereto but may be otherwise embodied within the scope of the following claims.

I claim:
1. An inlet water line connector for connecting an inlet water line having a predetermined outer diameter to the end of a water faucet shank having external threads on the outer cylindrical surface and a tapered internal inlet region larger in diameter than said predetermined outer diameter of the inlet water line, comprising:
a body having first and second ends and an opening therethrough into which first end an inlet water line of the predetermined outer diameter may be inserted, said body having an outer tapered surface for fitting within and engaging the tapered internal inlet region of the faucet shank, said body also having a shoulder in the form of an outward directed flange formed on said body between said outer tapered surface and said first end thereof against which pressure may be applied to force said shank with said outer tapered surface thereof having a forced fit with the tapered internal inlet region of the faucet shank;
a unitary spring member within said body having a plurality of integral spring elements projecting inward and angled toward said second end of said body, said spring elements in a free state collectively defining an inner periphery thereof of a diameter greater than the predetermined outer diameter of the inlet water line, said spring elements being elastically deflectable but remaining in a free state as the inlet water line is inserted through said body;
a first member within said body and normally positioned between the spring elements and the second end in spaced relation to said spring elements; and
force generating means cooperable with said outward directed flange of said body for compressing the body into the internal inlet region of said faucet shank to develop compressive forces which are transferred to said first member, with the forced fit between the outer tapered surface of the body and tapered internal region of the faucet shank limiting axial movement of the body toward the faucet shank, which said first member transferring the compressive forces developed between the body and force generating means through the spring elements for deflecting the spring elements into forcible engagement with the outer surface of said inlet water line.

2. An inlet water line connector in accordance with claim 1 wherein said body includes an inward directed shoulder between said outward directed flange and said outer tapered surface; and
an O-ring within said body and disposed between said inward directed shoulder and said first member, with the O-ring being squeezed by the compressive forces as such forces are being transferred to said first member between opposed surfaces of said shoulder and said first member as said body is compressed into the internal inlet region of said faucet shank.

3. An inlet water connector in accordance with claim 2 wherein said first member is generally ring shaped.

4. An inlet water line connector in accordance with claim 3 wherein said body is comprised of first and second body members, said first body member extending from approximately the axial location of said spring member to said first end of said body, and said second body member extending from approximately the axial location of said spring member to said second end of said body, said spring member being trapped between said first and second body members.

5. An inlet water line connector in accordance with claim 1 wherein said first member is generally ring shaped.

6. An inlet water line connector in accordance with claim 5 wherein said body is comprised of first and second body members, said first body member extending from approximately the axial location of said spring member to said first end of said body, and said second body member extending from approximately the axial location of said spring member to said second end of said body, said spring member being trapped between said first and second body members.

7. An inlet water line connector in accordance with claim 1 wherein said body is comprised of first and second body members, said first body member extending from approximately the axial location of said spring member to said first end of said body, and said second body member extending from approximately the axial location of said spring member to said second end of said body, said spring member being trapped between said first and second body members.

8. An inlet water line connector for connecting an inlet water line having a predetermined outer diameter to the end of a water faucet shank having external threads on the outer cylindrical surface and a tapered internal inlet region larger in diameter than said predetermined outer diameter of the inlet water line, comprising:

a body having first and second ends and an opening therethrough into which first end an inlet water line of the predetermined outer diameter may be inserted, said body having an outer tapered surface for fitting within and engaging the tapered internal inlet region of the faucet shank, said body also having a shoulder in the form of an outward directed flange formed on said body between said outer tapered surface and said first end thereof against which pressure may be applied to force said body into the internal inlet region of the faucet shank with said outer tapered surface thereof having a forced fit with the tapered internal inlet region of the faucet shank;

a retention element within said body including holding means having a relaxed and free state and a holding state, with said holding means remaining in a relaxed and free state as the water line is inserted through said body, with the holding means in its relaxed state being in spaced relation to said water line; and means for moving the holding means into its holding state after the water line has been inserted through said body to place the holding means into intimate contact with said water line.

9. An inlet water line connector in accordance with claim 8 wherein said body includes an inward directed shoulder between said outward directed flange and said outer tapered surface;

said moving means develops forces which compress said body into the internal inlet region of said faucet shank;

a first member within said body and normally positioned between the second end and said retention element; and an O-ring within said body and disposed between said inward directed shoulder and said first member, with the O-ring being squeezed between opposed surfaces of said shoulder and said first member as said body is compressed into the internal inlet region of said faucet shank.

10. An inlet water line connector in accordance with claim 9 wherein said first member is generally ring shaped.

11. An inlet water line connector in accordance with claim 10 wherein said body is comprised of first and second body members, said first body member extending from approximately the axial location of said retention element to said first end of said body and said second body member extending from approximately the axial location of said retention element to said second end of said body, said retention element being trapped between said first and second body members.

12. An inlet water line connector in accordance with claim 8 wherein said first member is generally ring-shaped.

13. An inlet water line connector in accordance with claim 12 wherein said body is comprised of first and second body members, said first body member extending from approximately the axial location of said retention element to said first end of said body, and said second body member extending from approximately the axial location of said retention element to said second end of said body, said retention element being trapped between said first and second body members.

14. An inlet water line connector in accordance with claim 8 wherein said body is comprised of first and second body members, said first body member extending from approximately the axial location of said retention element to said first end of said body, and said second body member extending from approximately the axial location of said retention element to said second end of said body, said retention element being trapped between said first and second body members.

15. An inlet water line connector for connecting an inlet water line having a predetermined outer diameter to the end of a water faucet shank having external threads on the outer cylindrical surface and a tapered inlet region larger in diameter than said predetermined outer diameter of the inlet water line comprising:

a body having first and second ends and an opening therethrough into which first end an inlet water line of the predetermined outer diameter may be inserted, said body having an outer tapered surface for fitting within and engaging the tapered internal inlet region of the faucet shank, said body also having a shoulder in the form of an outward directed flange formed on said body between said outer tapered surface and said first end thereof against which pressure may be applied to force said body into the internal inlet region of the faucet shank, with said outer tapered surface thereof having a forced fit with the tapered internal inlet region of the faucet shank;

a retention element within said body including holding means having a relaxed and free state and a holding state, with said holding means remaining in said relaxed and free state as the water line is inserted through said body, with the holding means in its relaxed state being in spaced relation to said water line; and means for generating a compressive force for moving the holding means into its holding state after the water line has been inserted through said body to place the holding means into intimate contact with said water line, said force generating means being capable of varying the magnitude of the compressive force acting on said holding means.

16. An inlet water line connector in accordance with claim 15 wherein said body includes an inward directed shoulder between said outward directed flange and said outer tapered surface; said generating means develops forces which compress said body into the internal inlet region of said faucet shank;

a first member within said body and normally positioned between the second end and said retention element; and an O-ring within said body entrapped between said inward directed shoulder and said first member, with the O-ring being squeezed between the opposed surfaces of said shoulder and said first member as said body is compressed into the internal member of said faucet shank.

17. An inlet water line connector in accordance with claim 16 wherein said first member is generally ring-shaped.

18. An inlet water line connector in accordance with claim 17 wherein said body is comprised of first and second body members, said first body member extending from approximately the axial location of said retention element to said first end of said body and said second body member extending from approximately the axial location of said retention element to said second end of said body, said retention element being entrapped between said first and second body members.

19. An inlet water line connector in accordance with claim 15 wherein said first member is generally ring-shaped.

20. An inlet water line connector in accordance with claim 19 wherein said body is comprised of first and second body members, said first body member extending from approximately the axial location of said retention element to said first end of said body, and second body member extending from approximately the axial location of said retention element to said second end of said body, said retention element being entrapped between said first and second body members.

21. An inlet water line connector in accordance with claim 15 wherein said body is comprised of first and second body members, said first body member extending from approximately the axial location of said retention element to said first end of said body, and said second body member extending from approximately the axial location of said retention element to said second end of said body, said retention element being entrapped between said first and second body members.

* * * * *